(12) United States Patent
Cui et al.

(10) Patent No.: US 9,854,452 B2
(45) Date of Patent: Dec. 26, 2017

(54) DEVICE AND METHOD FOR CLUSTERING SMALL CELLS IN TIME DIVISION DUPLEX NETWORK, AND BASE STATION

(71) Applicant: SONY CORPORATION, Tokyo (JP)

(72) Inventors: Qimei Cui, Beijing (CN); Mingliang Tao, Beijing (CN); Hui Liang, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/303,281

(22) PCT Filed: Apr. 22, 2015

(86) PCT No.: PCT/CN2015/077173
§ 371 (c)(1),
(2) Date: Oct. 11, 2016

(87) PCT Pub. No.: WO2015/169150
PCT Pub. Date: Nov. 12, 2015

(65) Prior Publication Data
US 2017/0034714 A1    Feb. 2, 2017

(30) Foreign Application Priority Data

May 8, 2014  (CN) .......................... 2014 1 0193669

(51) Int. Cl.
| | | |
|---|---|---|
| *H04W 40/00* | (2009.01) | |
| *H04W 16/26* | (2009.01) | |
| *H04W 16/10* | (2009.01) | |
| *H04J 11/00* | (2006.01) | |
| *H04L 5/14* | (2006.01) | |
| *H04L 12/26* | (2006.01) | |
| *H04W 28/02* | (2009.01) | |
| *H04L 29/06* | (2006.01) | |
| *H04W 88/08* | (2009.01) | |
| *H04W 16/32* | (2009.01) | |
| *H04W 92/20* | (2009.01) | |

(52) U.S. Cl.
CPC ......... *H04W 16/26* (2013.01); *H04J 11/0023* (2013.01); *H04L 5/14* (2013.01); *H04L 5/1469* (2013.01); *H04L 43/16* (2013.01); *H04W 16/10* (2013.01); *H04W 28/0278* (2013.01); *H04L 69/28* (2013.01); *H04W 16/32* (2013.01); *H04W 88/08* (2013.01); *H04W 92/20* (2013.01)

(58) Field of Classification Search
CPC ..................................................... H04W 16/26
USPC ....................................................... 455/446
See application file for complete search history.

(56) References Cited

U.S. PATENT DOCUMENTS

2012/0088506 A1    4/2012    Zhou et al.

FOREIGN PATENT DOCUMENTS

| CN | 102612042 A | 7/2012 |
|---|---|---|
| CN | 103391168 A | 11/2013 |
| WO | 2010/1211825 A1 | 10/2010 |

OTHER PUBLICATIONS

International Search Report dated Jul. 28, 2015 in PCT/CN2015/077173 filed Apr. 22, 2015.

*Primary Examiner* — Joel Ajayi
(74) *Attorney, Agent, or Firm* — Oblon, McClelland, Maier & Neustadt, L.L.P.

(57) ABSTRACT

A device and method for clustering small cells in a time division duplex network, and a base station including the device. The device includes: a request receiving unit, configured to receive from a small cell base station a clustering request for implementing dynamic clustering; and a clustering determining unit, configured to determine whether to implement clustering at least based on the clustering request.

15 Claims, 7 Drawing Sheets

DEVICE AND METHOD FOR CLUSTERING SMALL CELLS IN TIME DIVISION DUPLEX NETWORK, AND BASE STATION

FIELD OF THE INVENTION

The present invention generally relates to the field of wireless communications, and particularly relates to wireless communication techniques of Time Division Duplex (TDD). More particularly, the present invention relates to a device and a method for clustering small cells in TDD networks and a base station including the device. In addition, the present invention further relates to a computer program for implementing the above mentioned method, a computer readable storage medium including the computer program as well as an electronic device including a circuit for implementing the operations of the above mentioned method.

BACKGROUND OF THE INVENTION

LTE is a long term evolution of the technique standard of the Universal Mobile Telecommunications System (UMTS) established by the 3rd Generation Partnership Project (3GPP) organization. The architecture of the LTE wireless networks is more flattened, reducing the system delay and reducing the costs for network building and maintaining. In TDD-LTE, small cells and macro cells are provided. The small cell has a very small volume and can be used indoor and outdoor. Generally, the small cell can cover the indoor space of about 10 m or a range of 2 kilometers in the open air. The small cells are characterized in that they are densely disposed with the coverage ranges mutually crossed. In the scenario of LTE-A heterogeneous networks, the macro cells realize wide area coverage and the small cells realize Hot-point coverage.

Figure 1:
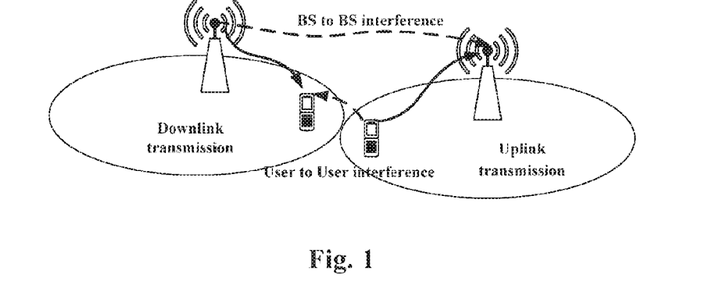
FIG. 1 is a schematic drawing illustrating an example of the conditions where sub-frame cross interferences occur between small cells.

Currently, the dynamic TDD-LTE system has 7 kinds of sub-frame configuration. Different sub-frame configurations provide different uplink to downlink sub-frame ratios according to different uplink and downlink throughputs. However, each small cell base station adjusting the sub-frame structure dynamically according to its requirement for throughput may lead to sub-frame cross interferences between adjacent small cells due to the difference in transmitting directions, as shown in FIG. 1.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present application, a device for clustering small cells in TDD networks is provided, including: an information acquiring unit, configured to acquire a transmitting feature among the small cells in the TDD networks and uplink traffic and/or downlink traffic of each small cell; and a clustering unit, configured to cluster the small cells based on the transmitting feature among the small cells and the uplink traffic and/or downlink traffic of each small cell acquired by the information acquiring unit, to obtain at least one small cell cluster.

According to another aspect of the present application, a base station is provided, including the above mentioned device.

According to still another aspect of the present invention, a method for clustering small cells in TDD networks is provided, including: acquiring a transmitting feature among the small cells in the TDD networks and uplink traffic and/or downlink traffic of each small cell; and clustering the small cells based on the acquired transmitting feature among the small cells and the uplink traffic and/or downlink traffic of each small cell, to obtain at least one small cell cluster.

According to other aspects of the present invention, there are further provided computer program codes and computer program product for implementing the above mentioned method for clustering small cells in TDD networks, as well as a computer readable storage medium on which computer program codes for realizing the aforementioned method for clustering small cells in TDD networks are recorded.

According to yet another aspect of the present application, an electronic device is further provided, including: a circuit, configured to perform the following operations: acquiring a transmitting feature among the small cells in the TDD networks and uplink traffic and/or downlink traffic of each small cell; and clustering the small cells based on the acquired transmitting feature among the small cells and the uplink traffic and/or downlink traffic of each small cell, to obtain at least one small cell cluster.

In addition, according to an aspect of the present application, there provides a device for clustering small cells in TDD networks, including: a request receiving unit, configured to receive from a small cell base station a clustering request requesting to perform dynamic clustering; and a clustering determining unit, configured to determine, at least based on the clustering request, whether to perform clustering.

According to another aspect of the present application, a base station is provided, including the above mentioned device.

According to another aspect of the present application, a base station is further provided, including: a clustering request transmitting unit, configured to transmit a clustering request to a control device.

According to another aspect of the present application, there further provides a method for clustering small cells in TDD networks, including: receiving from a small cell base station a clustering request requesting to perform dynamic clustering; and determining, at least based on the clustering request, whether to perform clustering.

According to other aspects of the present invention, there are further provided computer program codes and computer program product for implementing the above mentioned method for clustering small cells in TDD networks, as well as a computer readable storage medium on which computer program codes for realizing the aforementioned method for clustering small cells in TDD networks are recorded.

According to yet another aspect of the present application, an electronic device is further provided, including: a circuit, configured to perform the following operations: receiving from a small cell base station a clustering request requesting to perform dynamic clustering; and determining, at least based on the clustering request, whether to perform clustering.

The present application can realize at least one of the following advantages, by performing dynamical clustering according to the transmitting feature among the small cells and the uplink traffic and/or downlink traffic of each small cell: reducing the cross interferences as much as possible, making the TDD networks have higher throughput, thereby capable of increasing the utilization efficiency for the network resources.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE INVENTION

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

As stated above, in a dynamical TDD system, the dynamical adjustment of the sub-frame structure by each small cell base station may lead to sub-frame cross interferences between adjacent small cells due to difference in transmitting directions. This problem can be solved by clustering the small cells. Specifically, the small cell base stations producing serious cross interferences can be clustered into the same cluster, and the stations in the same cluster have the same transmitting direction at the same time, so as to avoid cross interferences.

The First Embodiment

Figure 2:
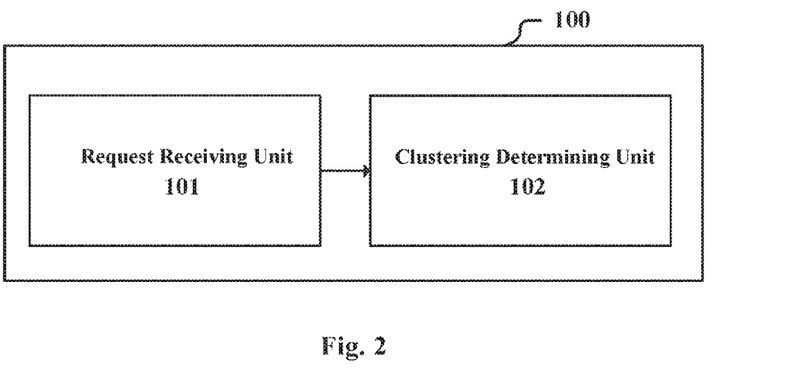
FIG. 2 is a structural block diagram illustrating the device for clustering small cells in Time Division Duplex (TDD) networks according to an embodiment of the present application.

FIG. 2 illustrates a block diagram of a device 100 for clustering small cells in Time Division Duplex (TDD) networks according to an embodiment of the present application. The device 100 includes: a request receiving unit 101, configured to receive from a small cell base station a clustering request requesting to perform dynamic clustering; and a clustering determining unit 102, configured to determine, at least based on the clustering request, whether to perform clustering.

Specifically, the device 100 is used to receive a clustering request from a small cell base station within its controlling range, and determine, based on the related parameters of the clustering request, whether to perform clustering. In other words, the device 100 adopts a triggered clustering scheme.

As an example, with respect to each small cell base station, the clustering request is transmitted when at least one of the following conditions is satisfied: an interference signal of the small cell station increases to a certain degree, a change of uplink and downlink traffic exceeds a preset value, and a decrease in throughput of the small cell exceeds a predetermined threshold. The interference signal can be represented by a reference signal receiving power (RSRP), for example. The interference signal enhancing to a certain degree means the interferences from the adjacent small cells increases, and thus it is necessary to perform clustering to guarantee the communication quality. Similarly, the decrease in throughput of the small cell exceeding a predetermined threshold also means that the degradation of the current network status exceeds the allowable extent, and it is desired to increase the throughput by clustering. In addition, taking the change of uplink and downlink traffic exceeding a preset value as one of the conditions is in consideration of the following: clustering the small cells with a small difference in uplink traffic or downlink traffic or the ratio of the two can increase the adaptability of service, so as to increase the throughput. This principle will be described in detail in conjunction with specific clustering processing in the following. It is to be understood that, the determining conditions of transmitting the clustering request are not limited to the above mentioned three conditions, and can be additionally added or substituted according to specific requirement and application.

The clustering request can be transmitted via an X-2 interface by respective small cell base stations. For example, the clustering request is a high clustering probability indication (HCPI), which can be incorporated into a LOAD INFORMATION message in the 36.423 standard and then transmitted.

In one example, the clustering determining unit 102 is configured to determine to perform clustering, when receiving the clustering requests from more than a predetermined number of small cell base stations within a predetermined period of time. Specifically, the clustering determining unit 102 can count the number of the received HCPIs, and determine to trigger clustering when the number is larger than a preset value. Of course, the clustering determining unit 102 can adopt any manner to perform the determination whether to trigger clustering, and the manner is not limited to the above example.

It can be seen that the device 100 makes the clustering become more flexible and timely by adopting the scheme of dynamical clustering based on request, so that the cross interferences among small cells can be decreased and the throughput of the network can be increased.

The Second Embodiment

Figure 3:
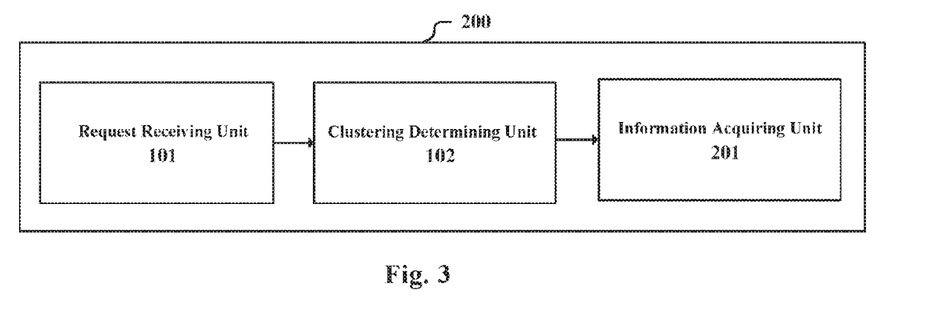
FIG. 3 is a structural block diagram illustrating the device for clustering small cells in TDD networks according to another embodiment of the present application.

FIG. 3 illustrates a block diagram of a device 200 for clustering small cells in TDD networks according to another embodiment of the present application. Besides the respective components shown in FIG. 2, the device 200 further includes: an information acquiring unit 201, configured to acquire information required for clustering from each small cell base station, after the clustering determining unit 102 determines to perform clustering.

The acquired information depends on the clustering method to be used. For example, the information can include a transmitting feature among the small cells and data related to uplink/downlink traffic of each small cell. The transmitting feature can be transmitting loss between small cells, and the transmitting loss can be coupling loss or path loss between small cells. In addition, the transmitting feature can also be the backhaul link time delay between small cell base stations. Alternatively, the transmitting feature can be a combination of the above items or part of them. The data related to uplink/downlink traffic can include, for example, a distribution ratio of the uplink traffic to the downlink traffic.

Figure 4:
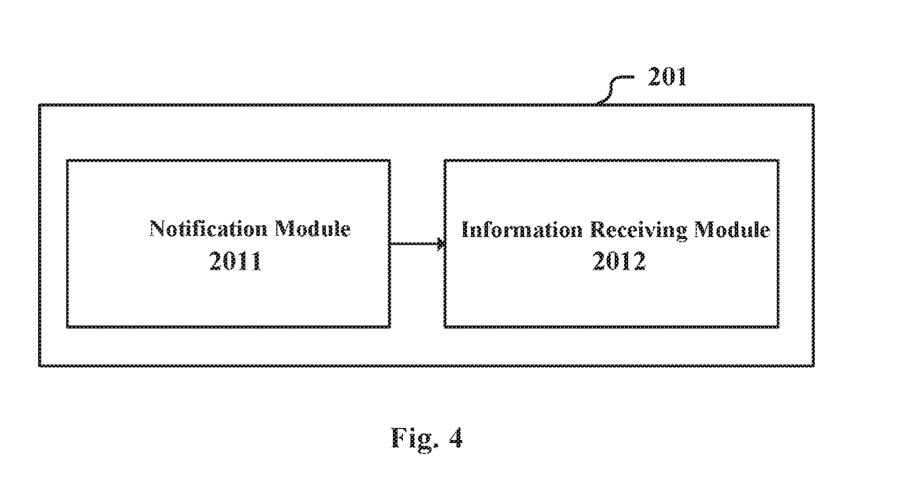
FIG. 4 is a structural block diagram illustrating a configuration example of the information acquiring unit in FIG. 3.

FIG. 4 illustrates a block diagram of an exemplary structure of the information acquiring unit 201. As shown in FIG. 4, the information acquiring unit 201 includes: a notification module 2011, configured to transmit a notification to each small cell base station for reporting the information and receive a reply thereof; and an information receiving module 2012, configured to receive the information from the corresponding small cell base station, in the case that the reply indicates the notification succeeded.

The notification module 2011 first transmits the notification to respective small cell base stations, and the small cell base stations check whether the required information can be provided upon receiving the notification. If the information can be provided, success is replied, otherwise, failure is replied.

The above notification, reply and information can be transmitted via the X-2 interface. For example, the notification is indicated by a coupling-loss-and-traffic-ratio (CLTR) flag which can be contained in a Report Characteristics IE in a Resource Status Request message in a Resource Status Reporting Initiation procedure, and the reply is transmitted by respective small cell base stations via Resource Status Response representing a successful notification or Resource Status Failure representing a failed notification. Specifically, The CLTR flag can be the sixth bit in the Report Characteristics IE, for example.

As an example, in the case that the information to be reported includes the data related to the uplink/downlink traffic, the data is maintained by the base station of the corresponding small cell, and is updated by updating the uplink traffic when there is a user reporting a buffer status report (BSR) among users of the base station of the corresponding small cell. Specifically, the downlink traffic can be automatically updated by the small cell base station according to its buffer status, while the uplink traffic has to be acquired by users of the small cell base station reporting their buffer status respectively. According to the configuration of the prior art, when new data arrives at a user or the uplink data buffer status changes, uploading of a new BSR report can be triggered automatically. As for a user who does not upload the BSR, its uplink data buffer status can be regarded as being not changed. Therefore, when a user reports the BSR, the uplink traffic of this user can be updated, while keeping the uplink traffic of the other users who have not reported the BSR unchanged. Similarly, the small cell base station further calculates its coupling loss and reports to the device 200.

After the small cell base confirms that it can provide the required information and transmits a reply indicating success, it performs the Resource Status Reporting procedure to upload the above mentioned information to the device 200. Specifically, the information can be contained in a Resource Status Update message as CLTR status information.

As an example, the CLTR status information can include the following fields: a CLTR status indication, a CL status and a TR status, wherein, the CLTR status indication represents whether the CL status and the TR status are valid, the CL status represents the coupling loss between the current small cell and the other small cells, and the TR status represents the distribution ratio of the uplink traffic to the downlink traffic of the current small cell. The CL status can be represented in integer strings, with each integer representing the coupling loss with one small cell. The number of coupling loss which can be transmitted is defined by defining the size of the integer strings. The distribution ratio of the uplink traffic to the downlink traffic can be represented by an integer field quantized into multiple sections, each section being corresponding to one kind of ratio.

After the small cell base station confirms that it can not provide the required information due to some reason and transmits a reply indicating failure, the device 200 can further inquire the small cell base station about the reason for the failure.

In addition, considering that the small cells may be in a shut-down state in future networks, in an example, the information acquiring unit 201 is configured, when a small cell is in the shut-down state, not to acquire information from the base station of this small cell.

The Third Embodiment

Figure 5:
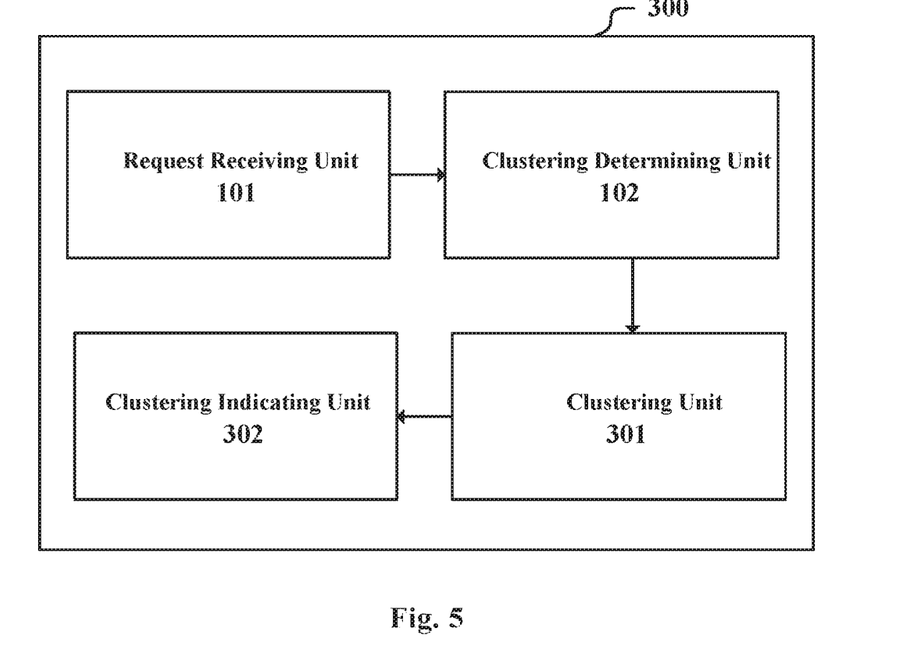
FIG. 5 is a structural block diagram illustrating the device for clustering small cells in TDD networks according to another embodiment of the present application.

FIG. 5 illustrates a block diagram of a device 100 for clustering small cells in TDD networks according to another embodiment of the present application. Besides the respective component shown in FIG. 2, the device 300 further includes: a clustering unit 301, configured to perform clustering on the small cells after the clustering determining unit 102 determines to perform clustering; and a clustering indicating unit 302, configured to indicate clustering results to each small cell base station after the clustering unit 301 performs clustering.

The clustering unit 301 can perform clustering using various methods, including but not limited to the various clustering methods according to embodiments of the present invention to be described later.

As an example, the clustering results can be sent via an X-2 interface. Herein, the clustering results include information of small cells included in each cluster, and can also include the selection of a cluster head of each cluster.

The clustering results can be transmitted to the small cell base stations via the CLUSTERING INDICATION procedure, wherein, the clustering results are contained in a Clustering Information message to be sent. The Clustering Information message includes a Cluster Head Indication IE representing whether a target small cell to which an indication is to be transmitted is a cluster head, and if the target small cell is a cluster head, the Clustering Information message further includes a Cluster Cell ID IE representing information of all small cell IDs in the cluster, while if the target small cell is not a cluster head, the Clustering Information message further includes a Cluster Head ID IE representing information of the cluster head in the cluster.

In addition, the clustering unit 301 can further determine the uplink and downlink sub-frame configuration of each cluster and contain them in the Clustering Information message to provide to each small cell. In other words, the Clustering Information message can further includes a Cluster Configuration IE representing an uplink and downlink sub-frame configuration in the cluster. Through deciding the sub-frame configuration of each cluster by the clustering unit 301 collectively, a balance in allocation can be achieved as much as possible. For example, the mutual interferences can be avoided as much as possible by allocating different configurations to two adjacent clusters.

As another example, it can also be the cluster head selected by the clustering unit 301 who determines the uplink and downlink sub-frame configuration of the cluster which it belongs to and notifies the ordinary small cells in the cluster.

Although not shown in FIG. 5, it can be understood that, the device 300 can also include the information acquiring unit 201 described with reference to FIG. 3, and the clustering unit 301 performs clustering processing based on the information acquired by the information acquiring unit 201.

The Fourth Embodiment

Figure 6:
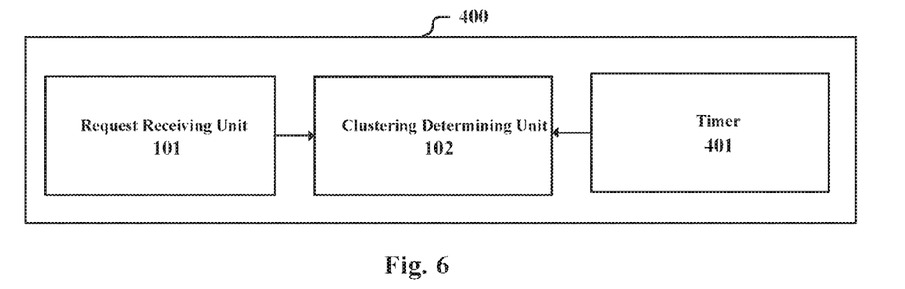
FIG. 6 is a structural block diagram illustrating the device for clustering small cells in TDD networks according to another embodiment of the present application.

FIG. 6 illustrates a block diagram of a device 400 for clustering small cells in TDD networks according to still another embodiment of the present application. Besides the respective components shown in FIG. 2, the device 400 further includes: a timer 401, configured to send a trigger signal to the clustering determining unit 102 at a predetermined period, wherein, the clustering determining unit 102 is configured to, upon receiving the trigger signal, determine to perform clustering when no clustering request is received within a predetermined period of time before a time instant when the trigger signal is received.

By incorporating the timer 401, the device 400 can achieve a dynamical clustering scheme where the periodical clustering and the triggered clustering are combined. Specifically, a predetermined clustering period $T_c$ is preset by the network side, so that clustering is performed again every time when $T_c$ elapses in the case of no triggered clustering. The above predetermined period of time is set such that the situation where periodical clustering is started during the trigged clustering will not occur.

In addition, the timer 401 can be further configured to reset after the clustering determining unit 102 determines to perform clustering. Such configuration can avoid the problem of performing frequent clustering unnecessarily, so as to ensure the normal communication.

Although not shown in FIG. 6, the device 400 can further include: an information acquiring unit 201, configured to acquire information required for clustering from each small cell base station, after the clustering determining unit 102 determines to perform clustering. The information can include a transmitting feature among the small cells and data related to uplink/downlink traffic of each small cell, wherein, the data related to uplink/downlink traffic of a small cell is maintained by a base station of the corresponding small cell, and is updated at the same period as the above mentioned predetermined period (for example, the period $T_c$).

The device 400 can supplement the two clustering manners with each other, and thus reducing the cross interferences among small cells while increasing the network throughput.

Generally, the device 100-400 in each of the above embodiments can be a separate controlling device, or can be located in a small cell base station or macro cell base station serving as a controlling center. In addition, the device 100-400 can also be located in each of the small cell base stations, and then one of them is dynamically activated by a particular instruction to perform the above mentioned respective controlling functions.

The Fifth Embodiment

Figure 7:
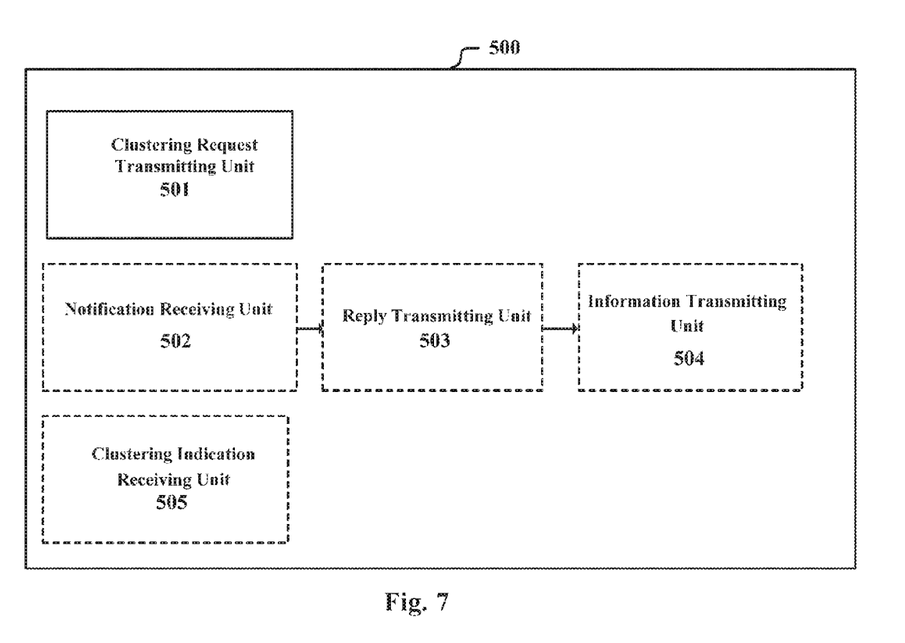
FIG. 7 is a structural block diagram illustrating the base station according to another embodiment of the present application.

The structure and function of the device for clustering small cells in TDD networks on the network side have been described in the above. During the procedure of describing each of the above devices, a base station is actually provided as well, including any one of the device 100 to 400. Correspondingly, the configuration of the base station on the small cell side is shown in FIG. 7, where the dashed line blocks represent optional components.

As can be seen, the base station 500 includes a clustering request transmitting unit 501, configured to transmit a clustering request to a control device. As stated previously, the base station 500 transmits a clustering request when detecting that it is necessary to perform clustering to satisfy the requirements for communication quality and throughput. For example, when at least one of the following conditions is satisfied, the clustering request transmitting unit 501 transmits the clustering request: an interference signal of each small cell station increases to a certain degree, a change of uplink and downlink traffic exceeds a preset value, and a decrease in throughput of the small cell exceeds a predetermined threshold. The control device is a device managing the clustering, and can be any one of the devices 100-400 as described in the first to fourth embodiments, for example.

Therefore, the base station 500 can transmit the clustering request in real time according to the actual communication status, so that the control device can perform dynamical clustering appropriately in response to this request, thereby guaranteeing the communication quality while increasing the network throughput.

In addition, in the above second embodiment, the control device may need to acquire related information from respective small cell base stations after determining to perform clustering. Correspondingly, the base station 500 can further include: a notification receiving unit 502, configured to receive a notification of requesting to report information required for clustering from the control device; a reply transmitting unit 503, configured to transmit a reply to the control device when the notification receiving unit 502 receives the notification; and an information transmitting unit 504, configured to transmit the information to the control device after the reply transmitting unit 503 transmits the reply, in the case of capable of acquiring the information.

In another example, the base station further includes: a clustering indication receiving unit 505, configured to receive clustering results from the control device. As stated above, the clustering results can include an information element indicating whether the base station of this small cell is specified as the cluster head. If it is specified as the cluster head, the clustering results further include IDs of all small cells in the cluster it belongs to, otherwise, the clustering results further include an ID of a Cluster Head of the cluster it belongs to.

Alternatively, if the base station 500 is not a cluster head, the clustering indication receiving unit 505 can also receive information about uplink and downlink sub-frame configuration from the cluster head of the cluster it belongs to.

The signaling procedures and the types of information related to the reception and reply of notification, the report of information and reception of clustering results have been described in detail in the second embodiment, and will not be repeated here.

The Sixth Embodiment

It is apparent that some processing or methods are also disclosed in the description above on the device 100-400 for clustering small cells in TDD networks according to embodiments of the present invention. Below, the summary of the methods is described without repeating the details which are already discussed above, however, it should be noted that although disclosed in the description of the device for clustering small cells in TDD networks, the methods do not certainly employ or are not certainly executed by the aforementioned components. For instance, embodiments of the device 100-400 for clustering small cells in TDD networks may be partially or completely achieved by hardware and/or firmware, and the method for clustering small cells in TDD networks described below may be fully achieved by a computer-executable program, although the methods may employ the hardware and/or firmware of the device 100-400 for clustering small cells in TDD networks.

Figure 8:
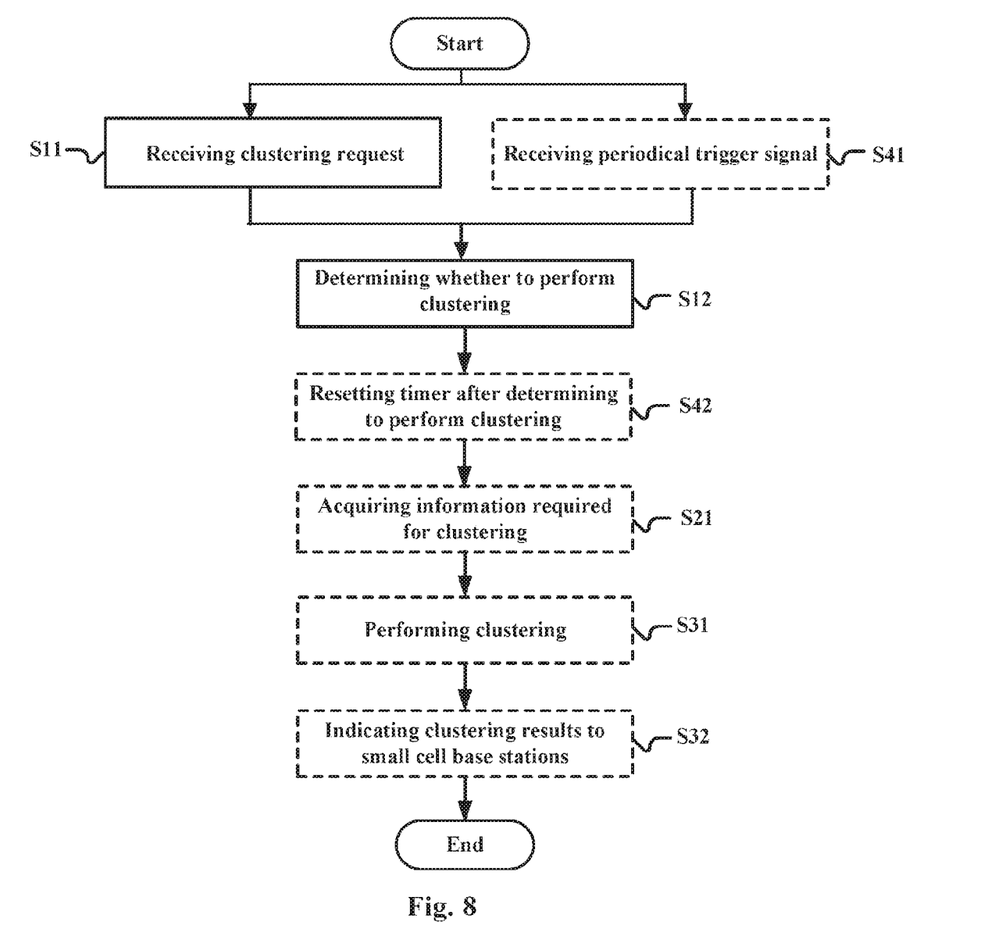
FIG. 8 is a flowchart illustrating the method for clustering small cells in TDD networks according to another embodiment of the present application.

FIG. 8 illustrates a flowchart of the method for clustering small cells in TDD networks according to embodiments of the present application. The method includes: receiving from a small cell base station a clustering request requesting to perform dynamical clustering(S11), and determining, at least based on the clustering request, whether to perform clustering (S12).

In an example, the clustering request can be transmitted when at least one of the following conditions is satisfied: an interference signal of each small cell station increases to a certain degree, a change of uplink and downlink traffic exceeds a preset value, and a decrease in throughput of the small cell exceeds a predetermined threshold. The clustering request can be transmitted via an X-2 interface by respective small cell base stations. For example, the clustering request is a high clustering probability indication, which is contained in a LOAD INFORMATION message and transmitted.

In the step S12, for example, when receiving the clustering requests from more than a predetermined number of small cell base stations within a predetermined period of time, it is determined to perform clustering.

The dashed line blocks shown in FIG. 8 represent optional steps. After it is determined to perform clustering in step S12, the step S21 can be performed to acquire information required for clustering from each small cell base station. The information for example can include a transmitting feature among the small cells and data related to uplink/downlink traffic of each small cell. As an example, the data related to uplink/downlink traffic can include a distribution ratio of the uplink traffic to the downlink traffic.

Figure 9:
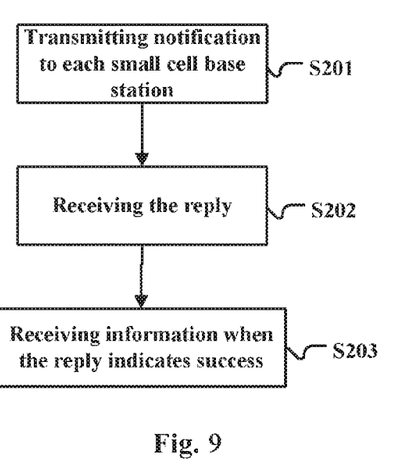
FIG. 9 is a flowchart illustrating the sub-steps of the step S21 in FIG. 8.

As shown in FIG. 9, the step S21 can include the following sub-steps: transmitting a notification to each small cell base station for reporting the information (S201), receiving a reply thereof (S202); and receiving the information from the corresponding small cell base station, in the case that the reply indicates the notification succeeded (S203).

The above mentioned notification, reply and information can be transmitted via an X-2 interface. The notification can be indicated by a coupling-loss-and-traffic-ratio (CLTR) flag which is contained in a Report Characteristics IE in a Resource Status Request message in a Resource Status Reporting Initiation procedure, and the reply is transmitted by respective small cell base stations via Resource Status Response representing a successful notification or Resource Status Failure representing a failed notification.

In addition, the reported information is contained in a Resource Status Update message as CLTR status information. For example, the CLTR status information includes the following fields: a CLTR status indication, a CL status and a TR status, wherein, the CLTR status indication represents whether the CL status and the TR status are valid, the CL status represents the coupling loss between the current small cell and the other small cells, and the TR status represents the distribution ratio of the uplink traffic to the downlink traffic of the current small cell.

The above mentioned data related to uplink/downlink traffic of a small cell can be maintained by a base station of the corresponding small cell, and updated by updating the uplink traffic when there is a user reporting a buffer status report (BSR) among users of the base station of the corresponding small cell.

In addition, when the base station of a small cell is in a shut-down state, acquiring of the information from the base station of this small cell is not performed in step S21.

Alternatively, the following steps can be further performed after determining to perform clustering in step S12: performing clustering on the small cells (S31), and indicating clustering results to each small cell base station (S32).

The clustering results can be transmitted via an X-2 interface. For example, the clustering results are contained in a Clustering Information message and transmitted via a CLUSTERING INDICATION procedure, wherein, the Clustering Information message includes a Cluster Head Indication IE representing whether a target small cell to which an indication is to be transmitted is a cluster head, and if the target small cell is a cluster head, the Clustering Information message further includes a Cluster Cell ID IE representing information of IDs of all small cells in the cluster, while if the target small cell is not a cluster head, the Clustering Information message further includes a Cluster Head ID IE representing information of the cluster head in the cluster.

Further, the Clustering Information message can further include a Cluster Configuration IE representing an uplink and downlink sub-frame configuration in the cluster.

Of course, all of the step S21 and the steps S31 and S32 can be performed. At this time, for example, the clustering in step S31 can be performed based on the information acquired in step S21.

In another example, the above method further includes a step S41: receiving a periodical trigger signal with a predetermined period from a timer. When receiving the trigger signal in step S41, if no clustering request is received in a predetermined period of time before the time instant when the trigger signal is received, it is determined to perform clustering in step S12.

In addition, the method can further include the step S42 of resetting the timer after determining to perform clustering.

Of course, all of the step S21 and the steps S41 and S42 can be performed. At this time, when the information includes the transmitting feature among the small cells and the data related to uplink/downlink traffic of each small cell, the data related to uplink/downlink traffic of the small cell is maintained by the base station of the corresponding small cell, and updated at the same period as the predetermined period.

It can be understood that, all of the steps in FIG. 8 can be performed as a method for clustering small cells in TDD networks.

The Seventh Embodiment

Figure 10:
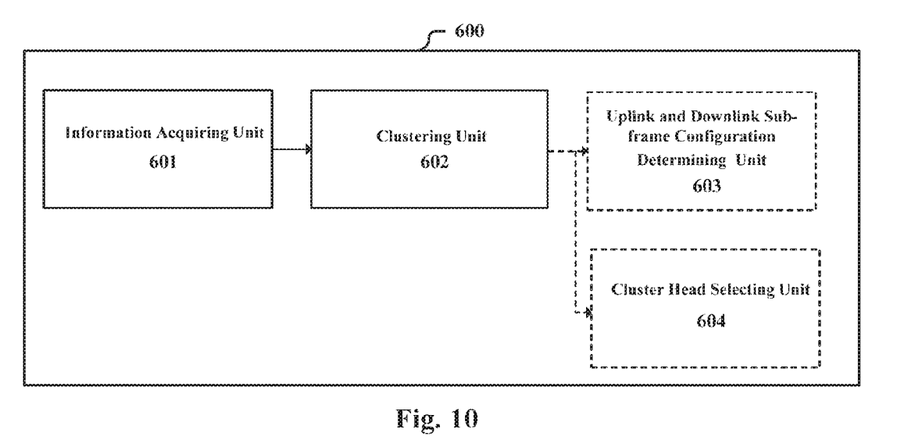
FIG. 10 is a structural block diagram illustrating the device for clustering small cells in TDD networks according to another embodiment of the present application.

The configuration of the device for clustering small cells in TDD networks using the clustering method according to embodiments of the present application will be described with reference to FIG. 10 to FIG. 12 in the following. It is to be noted that, the dashed line blocks in FIG. 10 denote optional components. As shown in FIG. 10, the device 600 includes: an information acquiring unit 601, configured to acquire a transmitting feature among the small cells in the TDD networks and uplink traffic and/or downlink traffic of each small cell; and a clustering unit 602, configured to cluster the small cells based on the transmitting feature among the small cells and the uplink traffic and/or downlink traffic of each small cell acquired by the information acquiring unit 601, to obtain at least one small cell cluster.

The current clustering method just takes the factor of large scale path loss into consideration, which factor is fixed, rendering the clustering fixed. The same uplink and downlink sub-frame configuration is adopted in the same cluster. Therefore, the uplink and downlink throughput of some base stations may be limited. The device 600 according to this embodiment achieves dynamical clustering by considering multiple factors including the transmitting feature among the small cells and uplink traffic and/or downlink traffic of each small cell, thereby reducing cross interferences as much as possible while maintaining high throughput.

It is to be noted that, the information acquiring unit 601 in the device 600 can adopt the configuration of the information acquiring unit 201 described above in the second embodiment. However, it is not limited thereto, and can adopt other appropriate structure or signaling procedure instead.

The transmitting feature herein can include transmitting loss. This is not limiting either, and can also include a backhaul link time delay between base stations, for example. As stated above, the transmitting loss can be coupling loss or path loss between small cells.

In this example, the clustering unit 602 performs clustering using a division metric between small cells calculated based on the acquired transmitting feature and uplink traffic and/or downlink traffic. The division metric means the possibility of clustering the corresponding two small cells into one cluster. A smaller value of the division metric means a larger possibility of being clustered into the same cluster, otherwise, the possibility is lower.

Figure 11:
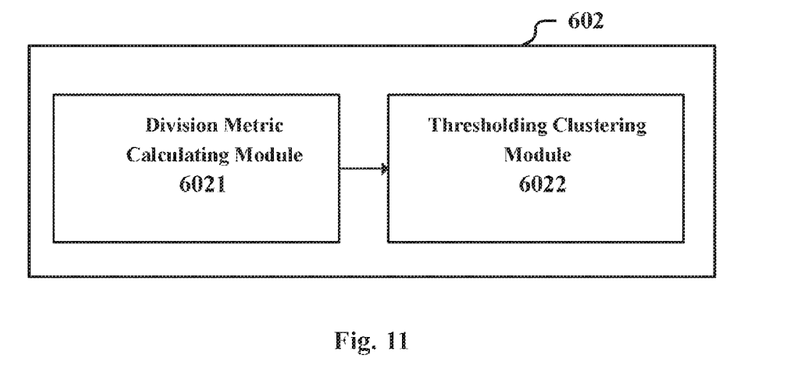
FIG. 11 is a structural block diagram illustrating one configuration example of the clustering unit shown in FIG. 10.
Figure 12:
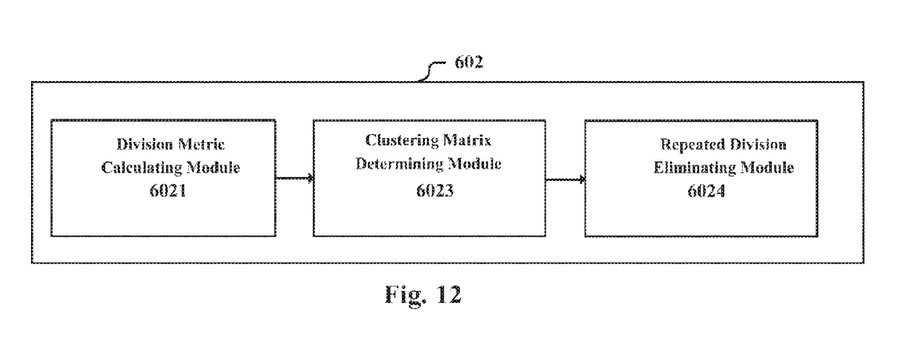
FIG. 12 is a structural block diagram illustrating another configuration example of the clustering unit shown in FIG. 10.

Specifically, as shown in FIG. 11, the clustering unit 602 can include a division metric calculating module 6021, configured to determine a difference in the uplink traffic and/or downlink traffic between two small cells and determine a division metric between the two small cells, wherein, the smaller the transmitting loss is and the smaller the difference in traffic is, the smaller the division metric is; while the larger the transmitting loss is and the larger the difference in traffic is, the larger the division metric is. The clustering unit 602 performs clustering based on the division metric.

The difference in the uplink traffic and/or downlink traffic can be difference in absolute value of amount, and can also be the difference in a distribution ratio of the uplink traffic to the downlink traffic between two small cells. When the difference is larger, it means that the corresponding two small cells should be clustered into different clusters as much as possible. Otherwise, their service requirement may not be satisfied simultaneously, thereby decreasing the utilization efficiency for network resources. On the other hand, smaller transmitting loss means larger interferences, and the two small cells should be clustered into the same cluster as much as possible to reduce the interferences.

As an example, the division metric calculating module 6021 can calculate a division metric utility function (DM) μ (which is also referred as division metric hereinafter) representing the division metric between the small cell i and the small cell j by the following equation (1).

$$u_{ij} = \frac{1}{S_i S_j} \left[ \alpha \frac{TL_{ij}}{avg, TL} + (1-\alpha) \frac{|\lambda_i - \lambda_j|}{\lambda_i + \lambda_j} \right] \quad (1)$$

The parameter $S_i$ is the small cell status indicating parameter, with $S_i=1$ indicating the small cell i is in the on state and $S_i=0$ indicating the small cell i is in the shut-down (off) state. This is because in the future networks, the on-off state of the small cells would become an important parameter, which will produce significant impact on clustering when the small cell is switched between on and off states. As can be seen from equation (1), when the small cell i is in the shut-down state, the division metric between it and all the other small cells becomes infinite, that is, the impact of this small cell can be neglected when performing clustering.

$TL_{ij}$ is the transmitting loss between the small cell i and the small cell j, and avg.TL is the average value of the transmitting loss. When the transmitting loss is the coupling loss, TL can be obtained by subtracting the antenna emitting gain of the base station i and the antenna receiving gain of the base station j from the transmitting loss. $\lambda_i$ and $\lambda_j$ denote the distribution ratios of the uplink traffic to downlink traffic of the small cell i and the small cell j respectively. $\alpha$ ($0\leq\alpha\leq1$) is a value representing the degree of significance of the factor of transmitting loss during clustering and can be preset according to requirement. The larger the value is, the larger proportion its corresponding factor of transmitting loss occupies when clustering.

In another example, DM can also be calculated by the following equation (2).

$$\mu_{ij} = \frac{1}{S_i S_j}\left[\alpha \frac{TL_{ij}}{avg.TL} + \beta \frac{|TU_i - TU_j|}{TU_i + TU_j} + \gamma \frac{|TD_i - TD_j|}{TD_i + TD_j}\right] \quad (2)$$

The same symbols in this equation have the same meaning as those in equation (1). TU and TD denote uplink traffic and downlink traffic respectively. As stated above, the uplink traffic is acquired by the users of the base station reporting their amount of data to be transmitted in the uplink buffer, and the downlink traffic is the amount of data to be transmitted in the downlink buffer of the base station. $\beta$ and $\gamma$ are similar to $\alpha$, representing the degree of significance of the factor of uplink traffic and that of the factor of downlink traffic respectively, wherein, $\alpha+\beta+\gamma=1$. It is to be understood that, $\alpha$, $\beta$, and $\gamma$ can be determined with empirical values, or determined by a reasonable number of experiments.

In the above example, TL and $\lambda$ or TU/TD can be directly reported to the device 600 by respective small cell base stations via the information acquiring unit, and can also be reported to the respective cluster heads and then reported to the device 600 by the respective cluster heads. In addition, $\lambda$ can also be calculated at the cluster head or the device 600, based on the TU and TD reported by the small cell base station, rather than be calculated by the small cell base station. The specific signaling procedure for acquiring the above information can be with reference to the description in for example the second embodiment, and will not be repeated here.

After the division metric calculating module 6021 calculates the DM values among all cells, the clustering unit 602 performs clustering using various algorithms based on the acquired DM values.

As shown in FIG. 11, the clustering unit 602 can use the thresholding clustering module 6022 to perform clustering. The thresholding clustering module 6022 is configured to: with respect to arbitrary two small cells in the network, compare the division metric between the two small cells with a predetermined clustering threshold, and cluster the two small cells into one small cell cluster when the division metric is lower than the predetermined clustering threshold. The predetermined clustering threshold can be set empirically.

In addition, the clustering unit 602 can be configured to determine the small cell cluster(s) based on the division metrics, by causing the division metric between small cell clusters obtained through dividing to be the largest, and the division metric within the small cell clusters to be the smallest. FIG. 12 illustrates an exemplary configuration of a clustering unit 602 using such a clustering manner. In this example, the clustering unit 602 performs clustering using a clustering matrix, and the clustering unit 602 includes: a clustering matrix determining module 6023, configured to determine, based on the division metrics, by causing the division metric between small cell clusters obtained through dividing to be the largest, the clustering matrix for clustering the small cells; and a repeated division eliminating module 6024, configured to, when a small cell is divided into multiple small cell clusters, divide it into a small cell cluster with the smallest average division metric.

Assuming there are N small cells in total, the clustering matrix is a N×N symmetric matrix C. In the matrix C, each element $C_{ij}$ (wherein, $1\leq i, j\leq N$) represents whether the small cell i and the small cell j are divided into the same cluster. For example, the $C_{ij}$ can have a value of 1 or 0, with the value 1 indicating the small cell i and the small cell j are divided into different clusters, and 0 indicating the small cell i and the small cell j are divided into the same cluster. Of course, the opposite definition is also feasible. It can be seen that the clustering matrix can serve as the basis for small cell clustering when determined.

Since the division metrics among respective small cells have been acquired, it is possible to acquire a clustering matrix which causes the division metric between small cell clusters to be the largest by an optimized algorithm.

As an example, the clustering matrix determining module 6023 can determine the clustering matrix using the 0-1 integer programming algorithm. Specifically, the algorithm causes $\Sigma\mu_{ij}c_{ij}$ to be the largest while satisfying the following condition (3).

$$c_{ij} = c_{ji} \quad (3)$$
$$c_{ii} = 0$$
$$\sum_{j=1}^{N} c_{ij} \geq N - M, i = 1, \ldots, N$$
$$c_{ij} = 0 \text{ or } 1$$

N-M denotes the largest number of small cells each cluster can have, which can be determined empirically.

However, there may be situations where a small cell is distributed repeatedly, that is, one small cell is clustered into multiple clusters, in the clustering results obtained by the clustering matrix determining module 6023 using the above algorithm. Therefore, the clustering unit 602 further includes the repeated division eliminating module 6024 to solve this problem.

For example, the repeated division eliminating module 6024 can calculate the average value of division metrics of the small cell cluster $R_i$ which the repeatedly distributed small cell u can be distributed into by the following equation (4).

$$\mu_{avg} = \frac{1}{N_{cell}^{R_i} - 1} \sum_{v \in R_i, v \neq u} \mu_{uv} \quad (4)$$

$N_{cell}^{R_i}$ represents the number of small cells in the small cell cluster $R_i$.

Through the above processing, the clustering unit 602 determines the clustering scheme. Since multiple factors including the transmitting feature and uplink traffic and/or downlink traffic are taken into consideration, the clustering scheme can reduce the cross interferences as much as possible while still maintaining large network throughput.

To facilitate understanding, an instance of clustering 6 small cells is given below. First, the division metrics among respective small cells are calculated based on the coupling loss and the distribution ratio of the uplink to downlink traffic, to form the following division metric matrix U.

$$U = \begin{bmatrix} 0 & 0.1625 & 0.2398 & 0.3195 & 0.2391 & 0.1975 \\ 0.1625 & 0 & 0.1161 & 0.2541 & 0.2518 & 0.1908 \\ 0.2398 & 0.1161 & 0 & 0.1949 & 0.2977 & 0.2548 \\ 0.3195 & 0.2541 & 0.1949 & 0 & 0.3342 & 0.3053 \\ 0.2391 & 0.2518 & 0.2977 & 0.3342 & 0 & 0.3586 \\ 0.1975 & 0.1908 & 0.2548 & 0.3053 & 0.3586 & 0 \end{bmatrix}$$

Then, assuming a maximum of 3 small cells are allowed to be existed in every cluster, the 0-1 integer programming algorithm is used to acquire the following clustering matrix C.

$$C = \begin{bmatrix} 0 & 1 & 0 & 1 & 1 & 1 \\ 1 & 0 & 1 & 0 & 1 & 1 \\ 0 & 1 & 0 & 1 & 0 & 1 \\ 1 & 0 & 1 & 0 & 1 & 0 \\ 1 & 1 & 0 & 1 & 0 & 1 \\ 1 & 1 & 1 & 0 & 1 & 0 \end{bmatrix}$$

That is, the following clustering results can be obtained: cluster 1 {1, 3}; cluster 2 {2, 4}; cluster 3 {1, 3, 5}; cluster 4 {2, 4, 6}; cluster 5 {3, 5}; cluster 6 {4, 6}. Since the phenomenon of repeated distribution exists, the final clustering results can be obtained by comparing the average division metric values within the clusters: cluster 3 {1, 3, 5}; cluster 4 {2, 4, 6}.

In addition, as shown by the dashed line blocks in FIG. 10, the device 600 can further include an uplink and downlink sub-frame configuration determining unit 603, configured to determine, based on the uplink and downlink traffic of the at least one small cell cluster, an uplink and downlink sub-frame configuration for the small cell cluster. In this situation, the device 600 can determine sub-frame configurations for respective clusters collectively. The advantage lies in that the sub-frame configurations for respective clusters can be made towards being balanced, for example, the interferences can be reduced as much as possible by preventing the adjacent clusters from using the same sub-frame configuration.

The uplink and downlink sub-frame configuration determining unit 603 can further determine, for the small cell cluster, an uplink and downlink sub-frame configuration adapted to the ratio of the uplink traffic to the downlink traffic thereof.

Furthermore, as shown by the dashed line blocks in FIG. 10, the device 600 can further include: a cluster head selecting unit 604, configured to select, in each small cell cluster determined by the clustering unit 602, a cluster head for managing small cells in the small cell cluster, and transmit information about the small cells contained in the small cell cluster to the cluster head.

In addition, in the case that the device 600 further includes the uplink and downlink sub-frame configuration determining unit 603, the device can further transmit the information of the determined uplink and downlink sub-frame configuration to the corresponding cluster head, which then provides the information to the respective small cells of the cluster which it belongs to. Of course, it is also possible that the device 600 transmits the information of uplink and downlink sub-frame configuration directly to the respective small cells including the cluster head. On the other hand, in the case that the device 600 does not include the uplink and downlink sub-frame configuration determining unit 603, the cluster head can determine the uplink and downlink sub-frame configuration by itself and notify the respective small cells it manages.

In one example, the cluster head selecting unit 604 can select, among all the small cells in the small cell cluster, a small cell which has the smallest average distance to the other small cells, as the cluster head. Of course, other criteria can be adopted for the selecting, and is not limited thereto.

Note that, the device 600 can further notify respective ordinary small cells of information of the cluster head of the cluster which an ordinary small cell belongs to. Or, the cluster head provides such information to the small cells it manages. The related signaling procedure for transmitting the clustering results have been described in the third embodiment in detail, and will not be repeated here.

The Eighth Embodiment

Figure 13:
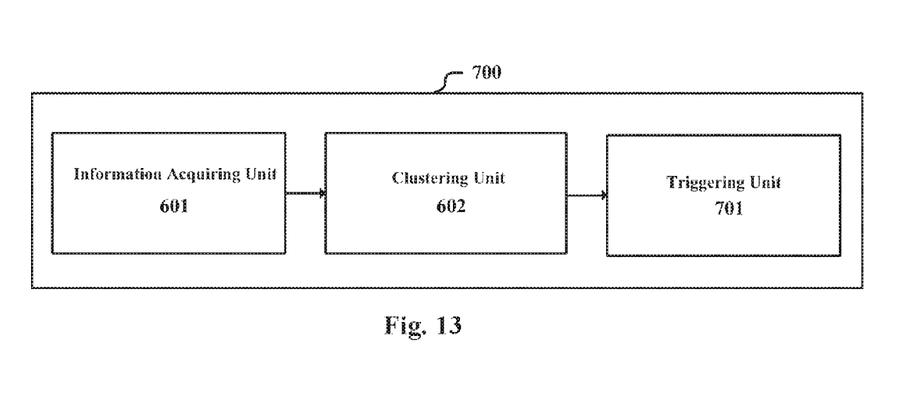
FIG. 13 is a structural block diagram illustrating the device for clustering small cells in TDD networks according to another embodiment of the present application.

FIG. 13 illustrates a structural block diagram of the device 700 for clustering small cells in TDD networks according to another embodiment of the present application. Besides the information acquiring unit 601 and the clustering unit 602 described with reference to FIG. 10, the device 700 further includes: a triggering unit 701, configured to trigger the information acquiring unit 601 and the clustering unit 602 to perform operations of clustering the small cells in the TDD networks, in the case of satisfying a predetermined condition.

The predetermined condition can include at least one of the following: a predetermined period of time lapses from the time when the clustering operation is performed last time; network state changes. The first condition can be set to achieve the periodical clustering at a period of a predetermined time length. The second condition can be performed to achieve dynamic triggered clustering. When the two conditions are both set, the combination of the two can be achieved.

The network state changing includes at least one of the following: an interference signal increases, the uplink and downlink traffic changes, and network throughput decreases. Of course, other indicators can also be used to indicate the network state changing, and are not limited thereto.

During the description of the above device 600 and 700, a base station is substantively provided, including any one of device 600 and 700.

It is to be understood that, the base station can be a base station of a small cell, and can also be a base station of a macro cell. In the case of the macro cell base station, the device 600 or 700 cluster small cells located in the coverage range of the macro cell base station. Further, the device 600 and 700 can also be located in a radio network controller (RNC).

As an example, the above mentioned base station further receives an instruction specifying this base station to manage the other base stations, and activates the device 600 or 700 for clustering small cells in TDD networks according to this instruction.

Specifically, for example, when every small cell base station includes the device 600 or 700 therein, one device 600 or 700 can be specified to perform clustering operations by receiving an instruction from a higher layer such as the macro cell base station, RNC or other controlling center.

The Ninth Embodiment

It is apparent that some processing or methods are also disclosed in the description above on the device 600 and 700 for clustering small cells in TDD networks according to embodiments of the present invention. Below, the summary of the methods is described without repeating the details which are already discussed above, however, it should be noted that the methods do not certainly employ or are not certainly executed by the aforementioned components.

Figure 14:
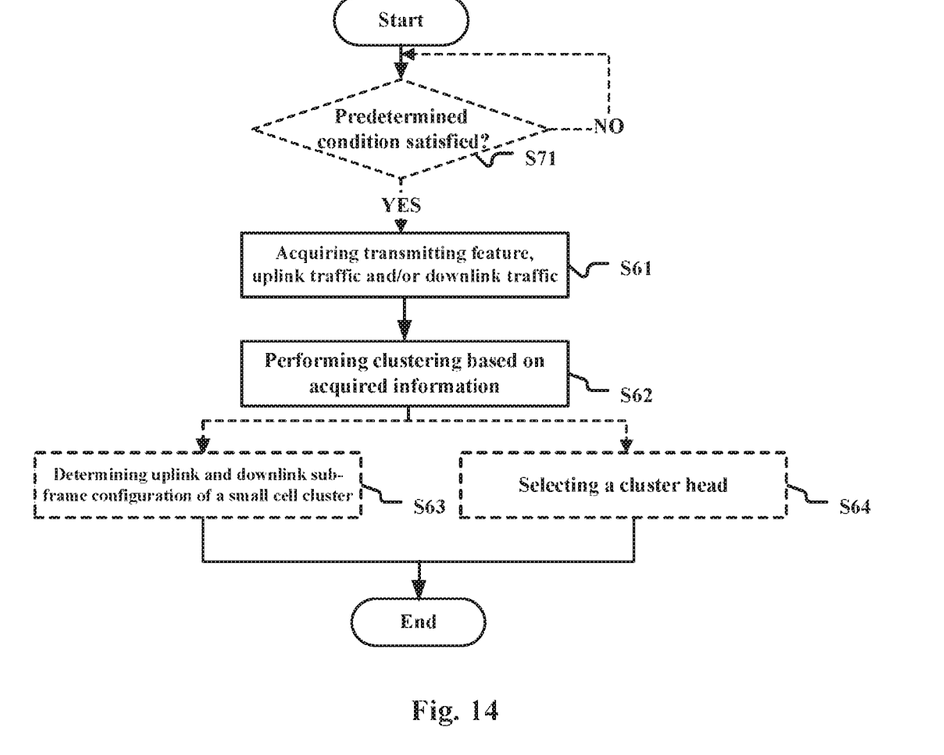
FIG. 14 is a flowchart illustrating the method for clustering small cells in TDD networks according to another embodiment of the present application.

As shown in FIG. 14, where the dashed line blocks denote optional steps, the method for clustering small cells in TDD networks includes: acquiring a transmitting feature among the small cells in the TDD networks and uplink traffic and/or downlink traffic of each small cell (S61); and clustering the small cells based on the acquired transmitting feature among the small cells and the uplink traffic and/or downlink traffic of each small cell, to obtain at least one small cell cluster (S62). The transmitting feature can include transmitting loss for example.

In the step S62, a difference in the uplink traffic and/or downlink traffic between two small cells is determined, and a division metric between the two small cells is determined, wherein, the smaller the transmitting loss is and the smaller the difference in traffic is, the smaller the division metric is, while the larger the transmitting loss is and the larger the difference in traffic is, the larger the division metric is, and clustering is performed based on the division metric. The difference can include a difference in a distribution ratio of the uplink traffic to the downlink traffic between two small cells.

In addition, in step S62, the small cell cluster(s) is determined based on the division metrics, by causing the division metric between small cell clusters obtained through dividing to be the largest, and the division metric within the small cell clusters to be the smallest. The specific algorithm has been described in the seventh embodiment, and will not be repeated here.

The above method can further include a step S63: based on the uplink and downlink traffic of the at least one small cell cluster, determining an uplink and downlink sub-frame configuration for the small cell cluster. In this step S63, an uplink and downlink sub-frame configuration adapted to the ratio of the uplink traffic to the downlink traffic of the small cell cluster can be determined for the small cell cluster.

Alternatively or additionally, the above method can further include a step S64: selecting, in each determined small cell cluster, a cluster head for managing small cells in the small cell cluster, and transmitting information about the small cells contained in the small cell cluster to the cluster head. For example, a small cell which has the smallest average distance to the other small cells among all the small cells in the small cell cluster can be selected as the cluster head.

Alternatively or additionally, the above method can further include a step S71: determining whether a predetermined condition is satisfied, and in the case of "YES" performing the operations of steps S61 and S62, otherwise continuing to wait.

The predetermined condition can include at least one of the following: a predetermined period of time lapses from the time when the clustering operation is performed last time; network state changes. The network state changing includes at least one of the following: an interference signal increases, the uplink and downlink traffic changes, and network throughput decreases.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Therefore, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1500 shown in FIG. 15) from a storage medium or network, wherein the computer is capable of implementing various functions when installed with various programs.

Figure 15:
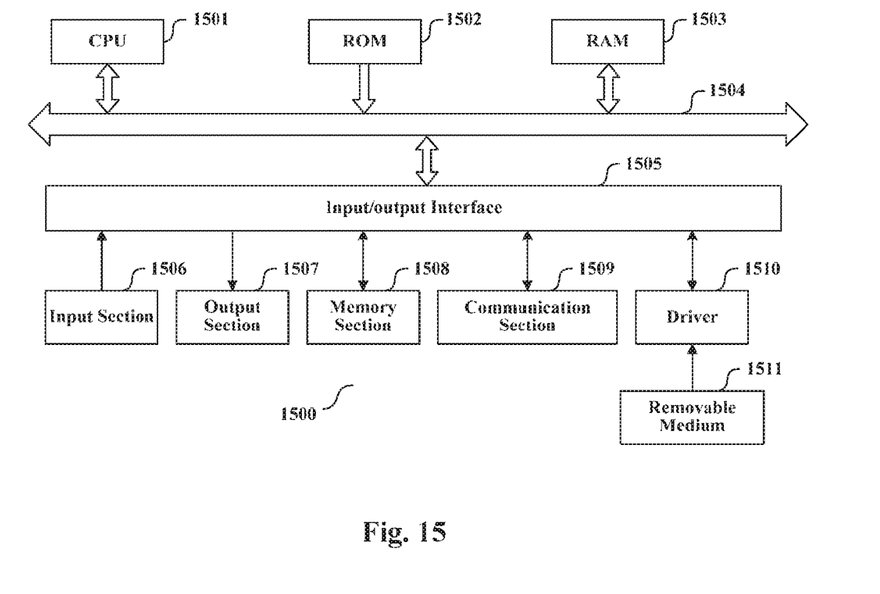
FIG. 15 is an exemplary block diagram illustrating the structure of a general purpose personal computer capable of realizing the method and/or device and/or system according to the embodiments of the present invention.

In FIG. 15, a computing processing unit (CPU) 1501 executes various processing according to a program stored in a read-only memory (ROM) 1502 or a program loaded to a random access memory (RAM) 1503 from a storage section 1508. The data needed for the various processing of the CPU 1501 may be stored in the RAM 1503 as needed. The CPU 1501, the ROM 1502 and the RAM 1503 are linked with each other via a bus 1504. An input/output interface 1505 is also linked to the bus 1504.

The following components are linked to the input/output interface 1505: an input section 1506 (including keyboard, mouse and the like), an output section 1507 (including displays such as a cathode ray tube (CRT), a liquid crystal display (LCD), a loudspeaker and the like), a storage section 1508 (including hard disc and the like), and a communication section 1509 (including a network interface card such as a LAN card, modem and the like). The communication section 1509 performs communication processing via a network such as the Internet. A driver 1510 may also be linked to the input/output interface 1505, if needed. If needed, a removable medium 1511, for example, a magnetic disc, an optical disc, a magnetic optical disc, a semiconductor memory and the like, may be installed in the driver 1510, so that the computer program read therefrom is installed in the memory section 1508 as appropriate.

In the case where the foregoing series of processing is achieved through software, programs forming the software are installed from a network such as the Internet or a memory medium such as the removable medium 1511.

It should be appreciated by those skilled in the art that the memory medium is not limited to the removable medium 1511 shown in FIG. 15, which has program stored therein and is distributed separately from the device so as to provide the programs to users. The removable medium 1511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1502 and the storage section 1508 in which programs are stored, and can be distributed to users along with the device in which they are incorporated.

To be further noted, in the device, method and system according to the invention, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. A device for clustering small cells in a Time Division Duplex (TDD) network, comprising:
   processing circuitry configured to:
   receive from a small cell base station a clustering request requesting to perform dynamic clustering, the dynamic clustering being a re-assignable coordination of sub frame messaging used by the small cells by coordinating sub-frame transmissions between the small cells to avoid sub-frame cross-interference between the small cells due to differences in transmitting directions;
   determine, at least based on the clustering request, whether to perform clustering,
   wherein
   the clustering request being triggered by the small base station detecting an inability of the small base station to satisfy a communication quality and/or throughput requirement on the small base station due to at least one of following conditions: an interference signal from another small cell base station increases to a certain degree, a change in uplink and downlink traffic exceeds a preset value, and a decrease in throughout of the small cell exceeds a preset threshold, and the processing circuitry is further configured to
   perform the clustering in response to receiving the clustering request from more than a predetermined number of small cell base stations within a predetermined period of time, and
   acquire from each small cell base station information required by the clustering, in response to the processing circuitry determining to perform clustering, the information including at least one of a transmitting direction, an indication of uplink traffic, and indication of downlink traffic, an uplink to downlink distribution ratio, and a current sub-frame configuration.

2. The device according to claim 1, wherein the clustering request is transmitted by each small cell base station via an X-2 interface.

3. The device according to claim 1, wherein the processing circuitry is further configured to:
   transmit a notification to each small cell base station for reporting the information and receive a reply of each small cell base station; and
   receive the information from corresponding small cell base station, in a case that the reply indicates the notification succeeded.

4. The device according to claim 3, wherein the information comprises a transmission feature among the small cells and data related to uplink/downlink traffic.

5. The device according to claim 4, wherein the data related to uplink/downlink traffic comprises the distribution ratio of uplink traffic to downlink traffic.

6. The device according to claim 5, wherein the notification, the reply, and the information are transmitted via an X-2 interface.

7. The device according to claim 4, wherein the data related to the uplink/downlink traffic of a small cell is maintained by a base station of the corresponding small cell, and is updated by updating uplink traffic when there is a user reporting a buffer status report (BSR) among users of the base station of the corresponding small cell.

8. The device according to claim 1, wherein the processing circuitry is configured not to acquire the information from a base station of a small cell in an off state.

9. The device according to claim 1, wherein the processing circuitry is further configured to:
   perform the clustering on the small cells after the clustering determining unit determines to perform the clustering; and
   indicate clustering results to each small cell base station after the clustering unit performs the clustering.

10. The device according to claim 9, wherein the clustering results are transmitted via an X-2 interface.

11. The device according to claim 1, further comprising:
    a timer, configured to send a trigger signal to the processing circuitry at a predetermined period;
    wherein the processing circuitry is further configured to, upon receiving the trigger signal, determine to perform the clustering in a case that no clustering request is received within a predetermined time period before a time instant when the trigger signal is received.

12. The device according to claim 11, wherein the timer is further configured to reset after the processing circuitry determines to perform the clustering.

13. The device according to claim 11, wherein the processing circuitry is further configured to:
    acquire information required by the clustering from each small cell base station after the processing circuitry determines to perform the clustering;
    wherein the information comprises a transmission feature among the small cells and data related to uplink/downlink traffic of each small cell,
    wherein the data related to the uplink/downlink traffic of the small cell is maintained by the base station of the corresponding small cell, and is updated at the same period as the predetermined period.

14. A base station that serves as a cluster head, comprising:

processing circuitry configured to transmit in a Time Division Duplex (TDD) network a clustering request, the processing circuitry further being configured to receive from a small cell base station a clustering request requesting to perform dynamic clustering, the dynamic clustering being a re-assignable coordination of sub frame messaging used by the small cells by coordinating sub-frame transmissions between the small cells to avoid sub-frame cross-interference between the small cells due to differences in transmitting directions;

determine, at least based on the clustering request, whether to perform clustering, wherein the clustering request being triggered by the small base station detecting an inability of the small base station to satisfy a communication quality and/or throughput requirement on the small base station due to at least one of following conditions: an interference signal from another small cell base station increases to a certain degree, a change in uplink and downlink traffic exceeds a preset value, and a decrease in throughout of the small cell exceeds a preset threshold, and the processing circuitry is further configured to perform the clustering in response to receiving the clustering request from more than a predetermined number of small cell base stations within a predetermined period of time, and acquire from each small cell base station information required by the clustering, in response to the processing circuitry determining to perform clustering, the information including at least one of a transmitting direction, an indication of uplink traffic, and indication of downlink traffic, an uplink to downlink distribution ratio, and a current sub-frame configuration.

15. A method for clustering small cells in a Time Division Duplex network with processing circuitry, comprising:

receiving from a small cell base station a clustering request requesting to perform dynamic clustering, the dynamic clustering being a re-assignable coordination of sub frame messaging used by the small cells by coordinating sub-frame transmissions between the small cells to avoid sub-frame cross-interference between the small cells due to differences in transmitting directions;

determining, at least based on the clustering request, whether to perform clustering, wherein the clustering request being triggered by the small base station detecting an inability of the small base station to satisfy a communication quality and/or throughput requirement on the small base station due to at least one of following conditions: an interference signal from another small cell base station increases to a certain degree, a change in uplink and downlink traffic exceeds a preset value, and a decrease in throughout of the small cell exceeds a preset threshold;

performing with the processing circuitry the clustering in response to receiving the clustering request from more than a predetermined number of small cell base stations within a predetermined period of time; and acquiring from each small cell base station information required by the clustering, in response to the processing circuitry determining to perform clustering, the information including at least one of a transmitting direction, an indication of uplink traffic, and indication of downlink traffic, an uplink to downlink distribution ratio, and a current sub-frame configuration.

* * * * *